(12) United States Patent
Smith

(10) Patent No.: US 7,165,890 B2
(45) Date of Patent: Jan. 23, 2007

(54) METAL-TO-METAL SPHERICAL BEARING

(75) Inventor: Paul Smith, Lincoln (GB)

(73) Assignee: Minebea Co. Ltd. (JP)

( * ) Notice: Subject to any disclaimer, the term of this patent is extended or adjusted under 35 U.S.C. 154(b) by 40 days.

(21) Appl. No.: 11/041,494

(22) Filed: Jan. 24, 2005

(65) Prior Publication Data
US 2005/0220381 A1 Oct. 6, 2005

(51) Int. Cl.
F16C 25/04 (2006.01)
(52) U.S. Cl. .................. 384/206; 384/912; 384/913
(58) Field of Classification Search ........... 384/206, 384/203, 204, 208, 209, 912, 913; 428/660
See application file for complete search history.

(56) References Cited

U.S. PATENT DOCUMENTS 4,434,189 A 2/1984 Zaplatynsky
4,848,934 A * 7/1989 Blakely et al. ............ 384/913
6,828,041 B2 * 12/2004 Ueda et al. ................ 428/660

FOREIGN PATENT DOCUMENTS

EP 0209925 A1 1/1987
EP 1114940 A2 7/2001

OTHER PUBLICATIONS

UK Patent Office, Combined Search and Examination Report. Aug. 17, 2004; 2 pp.; correspoding GB App # 0407313.6.

* cited by examiner

Primary Examiner—Lenard A. Footland
(74) Attorney, Agent, or Firm—ipsolon llp

(57) ABSTRACT

A metal-to-metal bearing comprising a bearing housing of a first material and a ball of a second material held within the housing, the interface between the housing and the ball comprising two bearing surfaces, wherein one of the first and second materials is a titanium alloy having a diffusion zone near its surface to which is adhered a coating of titanium nitride to provide one of the bearing surfaces.

7 Claims, 4 Drawing Sheets

METAL-TO-METAL SPHERICAL BEARING

TECHNICAL FIELD

This invention relates to metal-to-metal spherical bearings.

BACKGROUND

Metal-to-metal spherical bearings are used in the aerospace industry and have particular application to landing gear bearings in aircraft. Conventional materials used in the production of landing gear metal-to-metal bearings are stainless steel and copper alloy for the inner and outer races. These materials are used because they do not gall in areas where no lubricant is present. However, these are relatively heavy materials, so solutions have been sought in the past to use more lightweight materials. In this respect, it is possible to replace such relatively heavy materials on a strength basis with titanium alloy bearings which are approximately 40% lighter. Although there is a significant weight saving, these materials tend to gall very quickly under the loading conditions experienced in landing gears. U.S. Pat. No. 4,848,934 gives an example of a titanium alloy bearing. Since the titanium alloy is too soft for metal-to-metal contact, it is provided with a hard coating of chromium oxide.

Other coatings have been investigated but considerable problems are encountered with the adhesion of the hard coating to the relatively soft titanium alloy.

In a conventional metal-to-metal bearing, the bearing housing is manufactured from copper or a copper alloy and the ball held within the housing manufactured from stainless steel. Lightweight versions are available where the stainless steel component is replaced by a titanium alloy but this is a relatively soft material and is therefore provided with a relatively hard coating of chromium oxide so as to provide a good bearing surface at the interface between the bearing housing and the ball.

The use of chromium oxide and chromium plating techniques are environmentally unfriendly and entail considerable manufacturing costs so it is preferred not to use chromium oxide.

SUMMARY OF THE INVENTION

One aspect of the present invention provides a metal-to-metal bearing comprising a bearing housing of a first material and a ball of a second material held within the housing, the interface between the housing and the ball comprising two bearing surfaces, wherein one of the first and second materials is a titanium alloy having a diffusion zone near its surface to which is adhered a coating of titanium nitride to provide one of the bearing surfaces.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION

Figure 1:
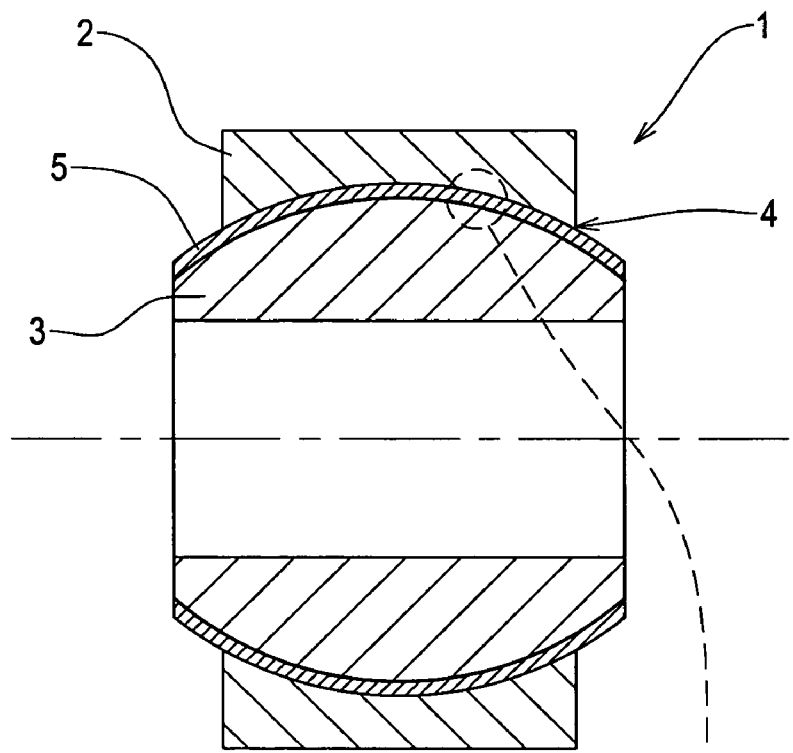
FIG. 1 is a schematic cross-section through a metal-to-metal bearing embodying the present invention.

Referring to FIG. 1, a metal-to-metal bearing 1 embodying the present invention comprises a bearing housing 2 and a ball 3 held within the housing 2. There is an interface 4 between the bearing surfaces of the ball and the housing which provides a bearing surface. In the example shown in FIG. 1, the outer surface of the ball 3 is provided with a coating 5. In this example, the ball 3 is manufactured from a titanium alloy and the bearing housing 2 from a copper alloy.

Figure 2:
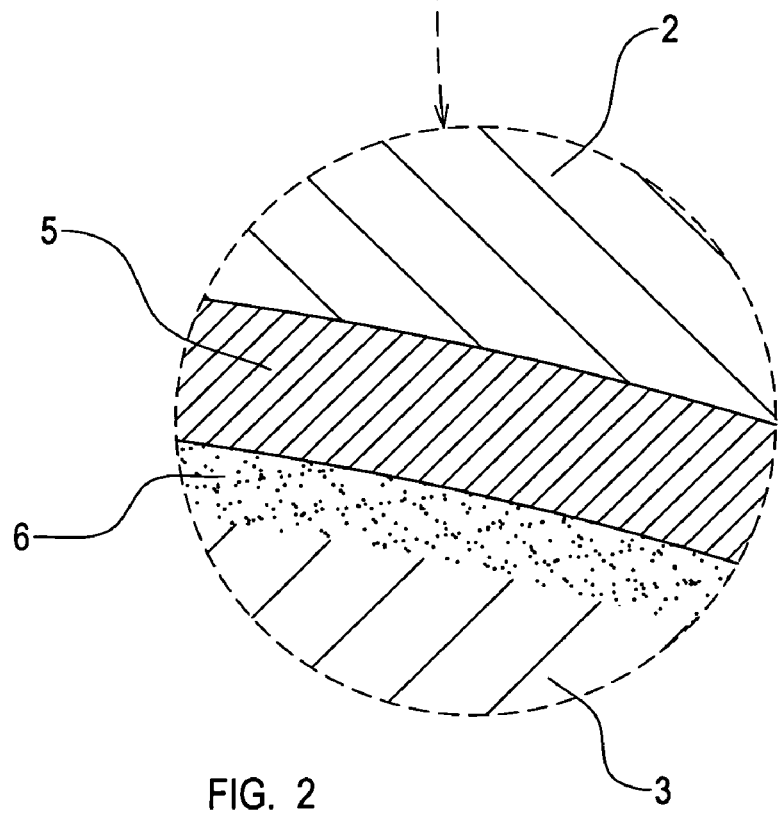
FIG. 2 is a detail of the interface between the bearing housing and the ball of the bearing of FIG. 1.

A nitride diffusion zone 6 (see FIG. 2) is formed in the titanium alloy outer surface of the ball 3 by nitrogen diffusion. The diffusion zone 6 hardens the outer surface and sub-surface and provides a good surface to which the coating 5 can be adhered. The coating 5 is applied to the surface of the diffusion zone 6. The coating is a titanium nitride coating over the surface of the titanium alloy. The coating is provided by a physical vapor deposition (PVD) process. The PVD coating is highly adhered to the diffusion zone 6 of the titanium alloy surface—better adhered than to a titanium alloy surface with no nitride diffusion zone.

It has been found that the above processing is best carried out under vacuum at 700° C., at which temperature there is minimal detrimental effect to the titanium alloy properties but bonding of the coating 5 to the diffused zone 6 in the titanium alloy outer surface of the ball 5 is greatly enhanced as opposed to simply depositing the coating on an untreated (i.e. a surface with no nitride diffusion zone) titanium alloy surface.

The resultant PVD coating 5 has considerable advantages over other coatings that might be employed because components can be finished and machined prior to coating making the parts interchangeable without further machining after coating. The coating and the titanium alloy have very good corrosion resistance which removes the need for any cadmium plating.

Figure 3:
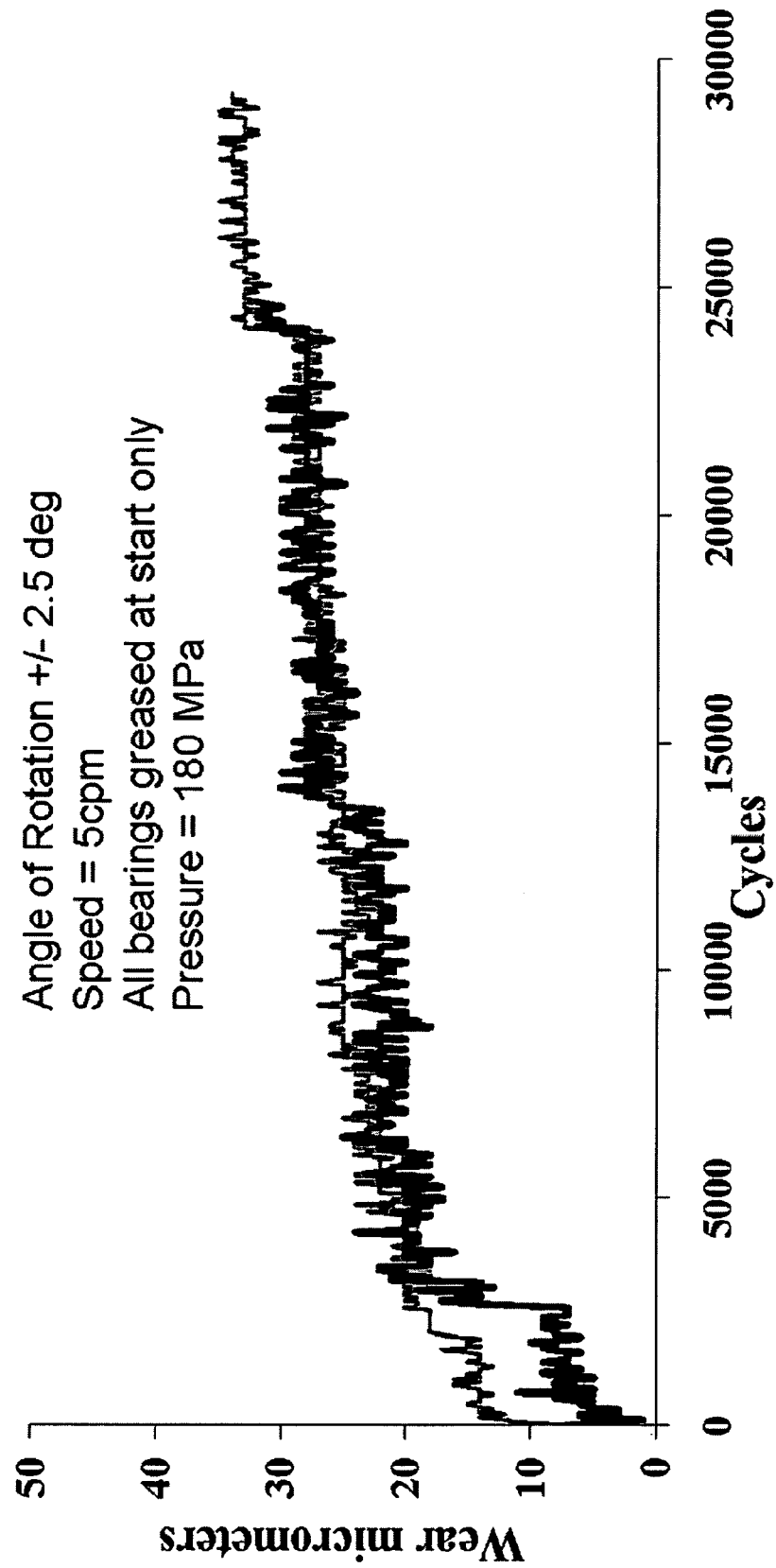
FIG. 3 is a wear vs cycles graph for a bearing embodying the invention and a conventional copper alloy and stainless steel bearing under 180 Mpa loading.
Figure 4:
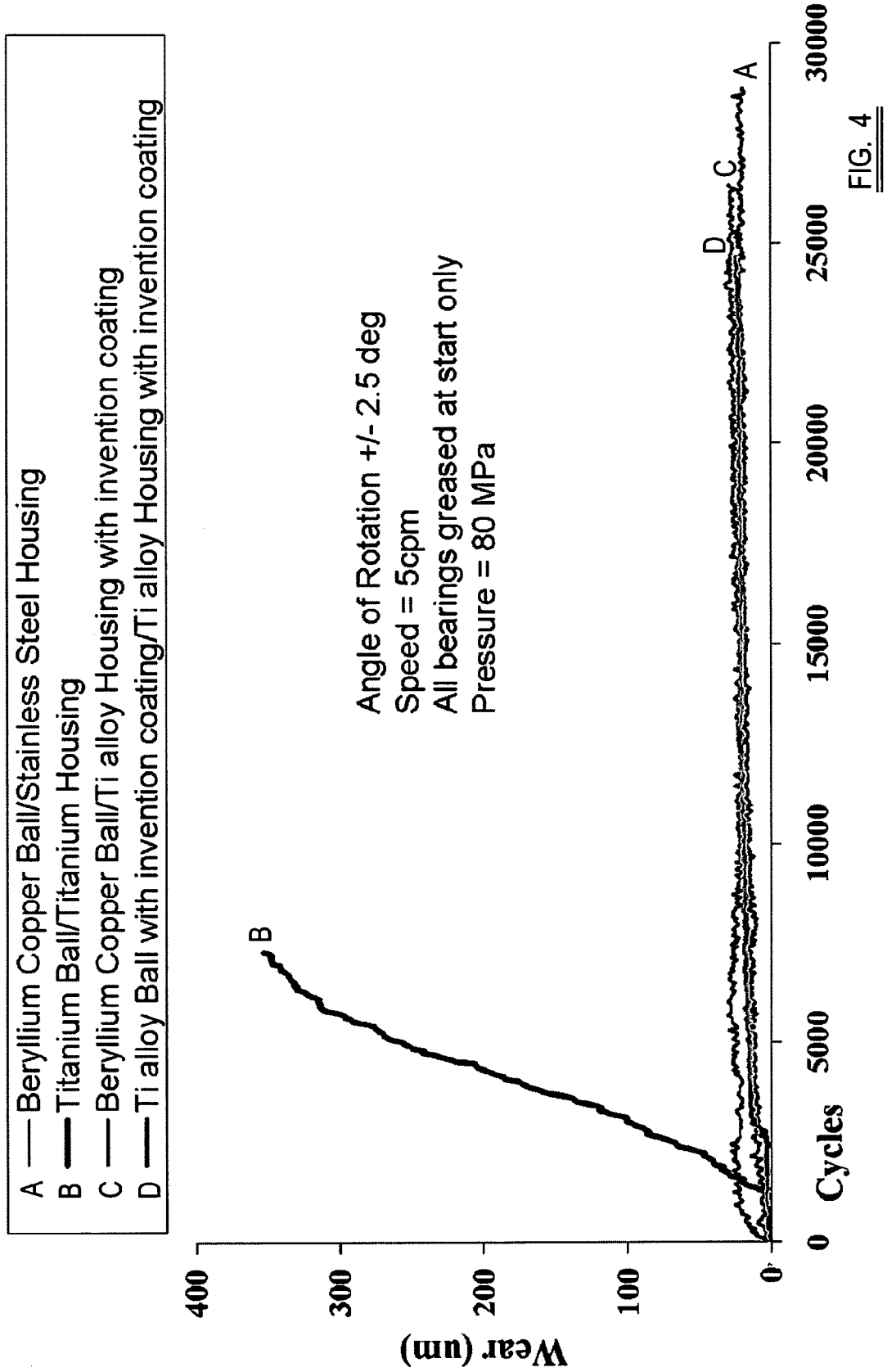
FIG. 4 is a wear vs cycles graph for two bearings embodying the invention, a conventional copper alloy and stainless steel bearing, and a Ti/Ti bearing.
Figure 5:
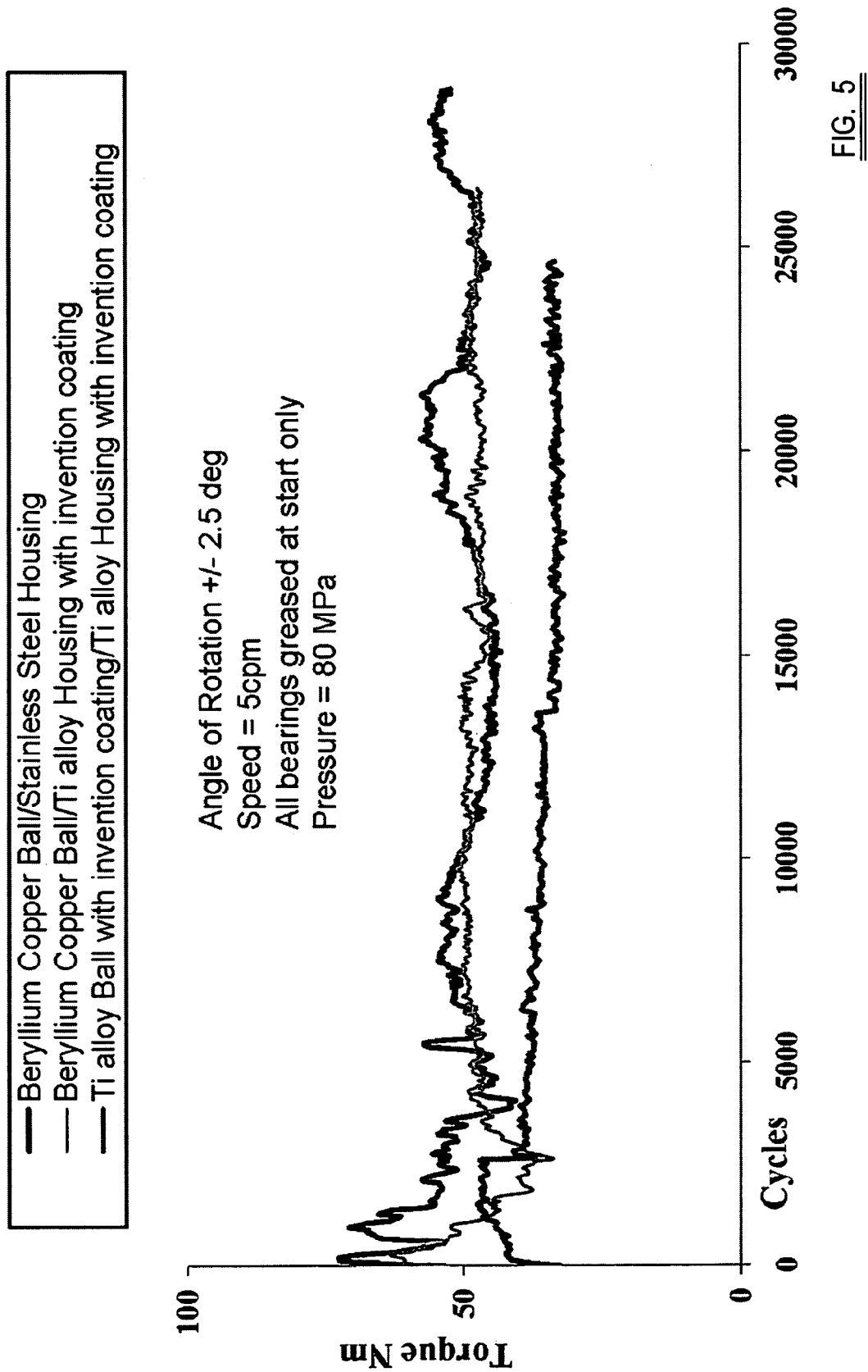
FIG. 5 is a torque vs cycles graph for two bearings embodying the invention and a conventional copper alloy and stainless steel bearing.

Surprisingly, results (see FIGS. 3 to 5) indicate that the tribological properties of such PVD coatings adhered to a nitride-diffusion zone are comparable to the conventional steel/copper alloy metal-to-metal bearing when used under landing gear conditions but yet benefit from substantial weight savings and do not require the use of environmentally unfriendly manufacturing techniques or materials.

In the above example, the ball is manufactured from titanium alloy and the housing from a copper alloy. This material selection can be reversed with the titanium nitride coating being applied to the surface of the titanium alloy bearing housing adjacent the ball. Additionally, it is also possible for both the bearing housing and the ball to be manufactured from titanium alloy, in which case, either the bearing housing, the ball or both can be provided with the diffusion zone and PVD titanium nitride coating as in the example results shown in FIGS. 3 to 5. Whilst Ti 6/4 alloy is specifically referred to above, other titanium alloys may also be used which exhibit surface hardening in response to nitrogen diffusion and improved adherence of the TiN coating.

The invention claimed is:

1. A metal-to-metal bearing comprising a bearing housing of a first material and a ball of a second material held within the housing, the interface between the housing and the ball comprising two bearing surfaces, wherein one of the first and second materials is a titanium alloy having a diffusion zone near its surface to which is adhered a coating to provide one of the bearing surfaces.

2. A bearing according to claim 1, wherein the coating is titanium nitride.

3. A bearing according to claim 1, wherein the other of the first and second materials is a copper alloy.

4. A bearing according to claim 1, wherein the other of the first and second materials is titanium alloy having a coating of titanium nitride at the bearing surface.

5. A bearing according to claim 1, wherein the coating is applied by a physical vapor deposition process.

6. A bearing according to claim 1, wherein the diffusion zone is a nitride diffusion zone in the titanium alloy surface creating a hardened subsurface.

7. A bearing according to claim 1, wherein the diffusion and physical vapor deposition processing is carried out under vacuum at 700° C. (1292°) Fahrenheit).

* * * * *